(12) United States Patent
Euteneuer et al.

(10) Patent No.: US 8,964,289 B2
(45) Date of Patent: Feb. 24, 2015

(54) MICROSCOPE INCLUDING MICRO AND MACRO OBJECTIVES

(75) Inventors: Peter Euteneuer, Lahnau (DE); Ralf Krueger, Butzbach Griedel (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 685 days.

(21) Appl. No.: 13/207,921

(22) Filed: Aug. 11, 2011

(65) Prior Publication Data

US 2012/0050851 A1 Mar. 1, 2012

(30) Foreign Application Priority Data

Aug. 30, 2010 (DE) .......................... 10 2010 039 950

(51) Int. Cl.
*G02B 21/06* (2006.01)
*G02B 21/00* (2006.01)
*G02B 21/02* (2006.01)
*G02B 21/08* (2006.01)
*G02B 21/24* (2006.01)
*G02B 27/28* (2006.01)

(52) U.S. Cl.
CPC ................ *G02B 21/02* (2013.01); *G02B 21/06* (2013.01); *G02B 27/28* (2013.01); *G02B 21/08* (2013.01); *G02B 21/248* (2013.01)
USPC ............................ 359/388; 359/368; 359/385

(58) Field of Classification Search
CPC .......... G02B 7/006; G02B 7/18; G02B 21/00; G02B 21/0004; G02B 21/0008; G02B 21/0012; G02B 21/0032; G02B 21/0068; G02B 21/0076; G02B 21/02; G02B 21/025; G02B 21/248
USPC ......................... 359/483.01, 494.01, 368–390
See application file for complete search history.

(56) References Cited

U.S. PATENT DOCUMENTS

| | | | | |
|---|---|---|---|---|
| 2,766,655 A | * | 10/1956 | Pinkowski | 359/370 |
| 6,069,734 A | * | 5/2000 | Kawano et al. | 359/390 |
| 6,226,118 B1 | * | 5/2001 | Koyama et al. | 359/380 |
| 6,366,398 B1 | | 4/2002 | Ouchi | |
| 6,473,230 B2 | * | 10/2002 | Hedrich | 359/385 |
| 7,835,075 B2 | * | 11/2010 | Boeker et al. | 359/381 |
| 2002/0097486 A1 | * | 7/2002 | Yamaguchi et al. | 359/380 |
| 2009/0091822 A1 | | 4/2009 | Suzuki | |

FOREIGN PATENT DOCUMENTS

| | | | |
|---|---|---|---|
| DE | 3205305 | A1 | 12/1982 |
| DE | 237915 | A1 | 6/1985 |
| DE | 102008032337 | A1 | 1/2010 |

* cited by examiner

*Primary Examiner* — Thong Nguyen
(74) *Attorney, Agent, or Firm* — Patentbar International, P.C.

(57) ABSTRACT

A microscope includes: an objective turret holding a micro and a macro objective for rotation to operational positions along an optical axis; observation optics in an imaging beam path, and an illumination device including a beam splitter for generating an illumination beam path and coupling the illumination beam path into the imaging beam path, the macro objective including a first subsystem attachable to the objective turret, and a second subsystem insertable into the imaging beam path between the turret and the observation optics when the first subsystem is operational, the illumination device allowing a telecentric beam path with an illumination pupil produced by either the micro objective or the macro objective, and adjustment optics in the illumination beam path having positive refractive power and causing the illumination pupil to be shifted to a rear exit pupil, located between the first optical subsystem and the beam splitter, of the macro objective.

15 Claims, 6 Drawing Sheets

MICROSCOPE INCLUDING MICRO AND MACRO OBJECTIVES

CROSS-REFERENCE TO RELATED APPLICATIONS

This application claims priority to German Patent Application No. DE 10 2010 039 950.7, filed Aug. 30, 2010, that is incorporated herein by reference in its entirety.

FIELD OF THE INVENTION

The present invention relates to a microscope comprising an objective turret for holding at least one micro objective and/or a macro objective, which can be rotated into an operation position on an optical axis, observation optics in an imaging beam path, a macro objective composed of a plurality of optical subsystems; a first optical subsystem being attachable to the objective turret, and a second optical subsystem being insertable into the imaging beam path between the objective turret and the observation optics when the first optical subsystem is rotated in its operating position on the optical axis.

BACKGROUND OF THE INVENTION

A microscope having a macro-objective is known, for example, from DE 32 05 305 A1. The macro-objective is referred to therein as "survey objective". The survey objective is intended for survey observation of large object fields at magnifications between 1× and 1.6×. It is problematic to integrate such survey objectives into conventional objective turrets which carry objectives having a usual magnification for microscopic observation. The problem resides in that the parfocal length of a survey objective or macro objective is greater than that of microscope objectives having a usual magnification. The parfocal length (also "optical-mechanical overall length") is defined as the distance between the object plane in the specimen and the shoulder of the flange by which the objective is supported on the objective turret. The use of parfocal objectives eliminates the need for refocusing when switching between two objectives using an objective turret during microscopic observation. A typical parfocal length for objectives is 45 mm. The use of a non-parfocal macro-objective would require considerable changes to be made to the microscope settings when switching to and from survey observation. One option mentioned in the cited document for integrating a survey objective into a conventional objective turret is using an arrangement in which a so-called Bertrand lens is insertable into the tube of the microscope and axially displaceable therein, or one in which such a Bertrand lens is insertable into the microscope tube and an auxiliary lens is additionally used. However, with regard to the telecentric optical path in the object space, which is advantageous for imaging purposes, these arrangements are unfavorable.

Therefore, German document DE 32 05 305 A1 proposes a survey objective which is made of two subsystems, one of which is disposed on the objective turret such that it can be switched into the optical path of the microscope, and the other optical subsystem is disposed such that can be switched into the optical path between the objective turret and the microscope tube. In this arrangement, the parfocal length of the first-mentioned subsystem is equal to that of the other switchable objectives. Further, the second-mentioned optical subsystem may be axially displaceable to allow for adjustment to the accommodation properties of the observer's eye.

The respective transmitted light research microscope "JENA VAL" of the Jenoptik Jena GmbH company achieves a maximum object field diameter of 25 mm.

The Nikon company offers 0.5× macro objectives ("Ultra-Low Mag 0.5× Objective") including additional optics disposed in the objective space and additional optics disposed outside of the objective space in the region of the magnification changer of the microscope.

The Applicant offered a modular system for research microscopes ("Leica DM R") where a macro objective is integrated into an objective turret by way of additional optics disposed outside of the objective space in the region of the magnification changer.

The above-described approaches for integrating a macro objective into an objective turret carrying microscope objectives of usual magnification are designed for transmitted illumination only.

For incident illumination, one option for integrating a macro objective into an objective turret carrying microscope objectives of usual magnification (here referred to as "micro objectives") is described in DE 10 2008 032 337 A1. Here, in order to implement an imaging and incident illumination beam path, there is proposed an objective of low magnification (here referred to as "macro objective") including a total of three lens groups. A first lens group is disposed within the usual objective parfocal length, while a second lens group is disposed at the position of the exit pupil of the macro objective. A third lens group is disposed in the incident illumination beam path between an incident illumination tube lens and a mirror of a mirror system, said mirror directing the incident illumination beam path into the first lens group of the macro objective, and from there to the object. According to an advantageous embodiment of the macro objective proposed therein, the second and third lens groups form part of this mirror system, which is disposed downstream of the first lens group of the objective, as viewed in the direction of the imaging beam path. The second lens group, which has positive refractive power, is disposed downstream of the mirror in the imaging beam path, while the third lens group is in the aforementioned position in the incident illumination beam path. The third lens group has negative refractive power and is not involved in the actual imaging of the object into the eyepiece intermediate image plane. This lens group is only involved in the incident illumination and causes a virtual image of the incident light to be formed at the position of the second lens group where the exit pupil of the macro objective is located. Thus, the (virtual) illumination pupil is placed in the rear exit pupil of the macro objective.

Finally, U.S. Patent Application Publication No. 2009/0091822 A1 discloses a zoom microscope for fluorescence microscopy, including a zoom observation optical system and a zoom illumination optical system. However, since when the zoom microscopes proposed therein are operated in the low-magnification range, it is said that the illumination pupil is far from the objective pupil, which results in the problem of shading of the incident illumination light. In order to avoid this, it is proposed here to provide an activatable optical system which forms an image of the light source near the pupil of the objective. This optical system is disposed in the incident illumination beam path here as well.

SUMMARY OF THE INVENTION

It is an object of the present invention to provide a microscope for reflected light examination, in which a macro objective is integrated into an objective turret carrying microscope objectives of usual magnification, and which allows easy switching between microscopic observation and survey observation under homogeneous illumination. Another object is to provide a simple way of suppressing reflections.

A microscope includes: an objective turret holding a micro and a macro objective for rotation to operational positions along an optical axis; observation optics in an imaging beam path, and an illumination device including a beam splitter for generating an illumination beam path and coupling the illumination beam path into the imaging beam path, the macro objective including a first subsystem attachable to the objective turret, and a second subsystem insertable into the imaging beam path between the turret and the observation optics when the first subsystem is operational, the illumination device allowing a telecentric beam path with an illumination pupil produced by either the micro objective or the macro objective, and adjustment optics in the illumination beam path having positive refractive power and causing the illumination pupil to be shifted to a rear exit pupil, located between the first optical subsystem and the beam splitter, of the macro objective.

It will be understood that the aforementioned features and those described below can be used not only in the specified combinations, but also in other combinations or alone without departing from the scope of the present invention.

The present invention and its advantages are schematically illustrated in the drawings using an exemplary embodiment, and will be described below in detail with reference to the drawings.

DETAILED DESCRIPTION OF THE PREFERRED EMBODIMENTS

Figure 1A:
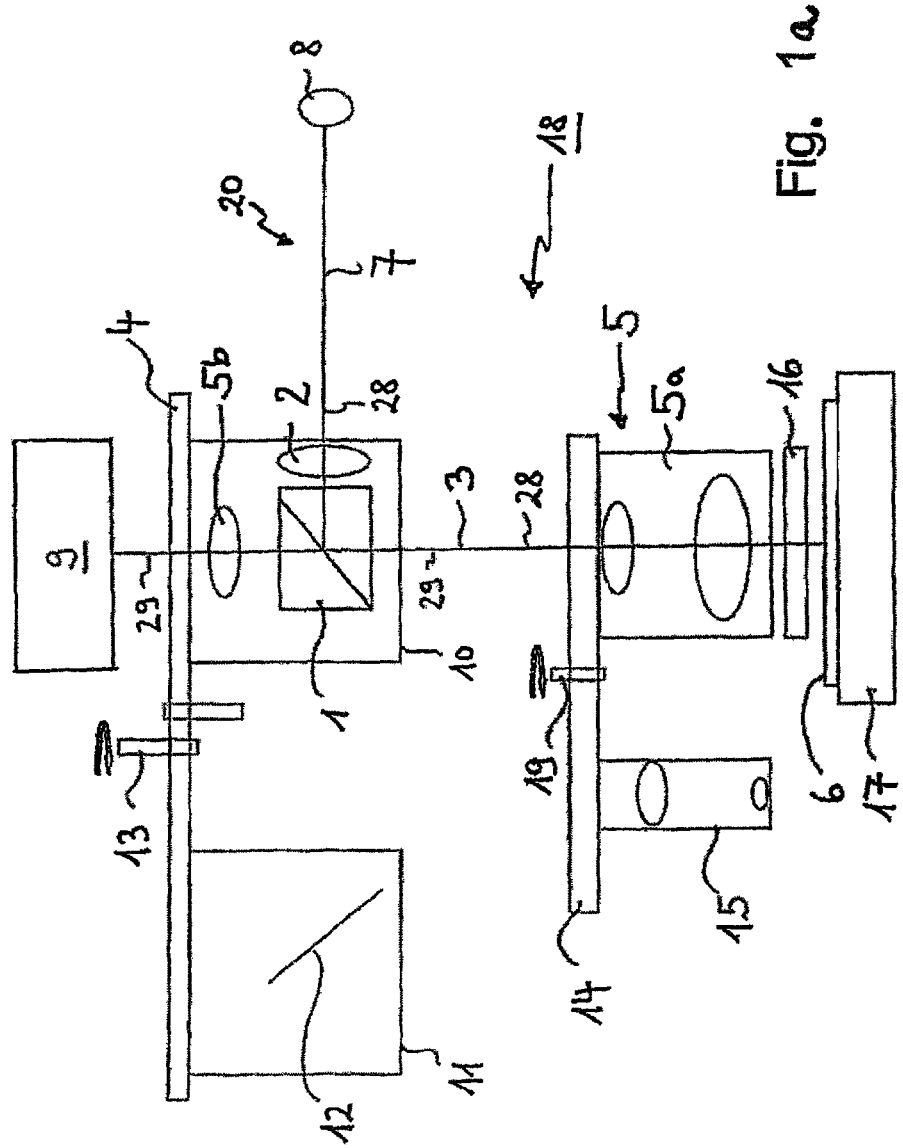
FIG. 1a is a schematic view of the components of an inventive microscope that are relevant to the present invention in a particular embodiment.

A microscope can include an objective turret for holding at least one micro objective which can be rotated into an operation position on an optical axis, and further including observation optics in an imaging beam path of the microscope, as well as a macro objective composed of a plurality of optical subsystems; a first optical subsystem being attachable to the objective turret, and a second optical subsystem being insertable into the imaging beam path between the objective turret and the observation optics when the first optical subsystem is rotated into its operating position on the optical axis of the microscope, is characterized in accordance with the invention in that provision is made for an incident illumination device generating an illumination beam path and including a beam splitter for coupling the illumination beam path into the imaging beam path; this incident illumination device allows a telecentric illumination beam path with an illumination pupil on the objective side to be produced both by a micro objective in its operating position and, alternatively, by the first optical subsystem of the macro objective in its operating position. To this end, when the macro objective is in its operating position, in which the optical subsystems thereof are inserted in the optical axis of the microscope, adjustment optics are insertable into the illumination beam path, causing the illumination pupil to be shifted to the rear exit pupil of the macro objective, said exit pupil being located between the first optical subsystem and the beam splitter. It has been found that this can be accomplished by adjustment optics having positive refractive power.

When the micro objectives or the macro objective are in their respective operating positions, this configuration forms an illumination pupil on the side of the objective; i.e., an illumination pupil whose position is located toward the micro objective, respectively toward the first optical subsystem of the macro objective, as viewed from the beam splitter. Furthermore, a macro objective is used, the rear exit pupil of which is located between the first optical subsystem of the macro objective and the beam splitter. Finally, the adjustment optics and the positive refractive power thereof ensure that the illumination pupil is shifted to the rear exit pupil of the macro objective when the macro objective is in its operating position. These measures prevent vignetting and light loss from occurring when switching between microscopic observation and survey observation using the macro objective. At the same time, the telecentric illumination allows continuous focusing; i.e., varying the distance between the object and the front lens of the respective objective.

These measures are advantageous in particular in the case of a two-part macro objective that provides telecentric illumination in the object space ("telecentric objective"). In particular in objectives of this type, the rear exit pupil is clearly shifted toward the second optical subsystem, which is further away from the object. In contrast, in micro objectives of usual magnification, the rear exit pupil is generally located in the objective itself. The measures of the present invention ensure that the illumination pupil is shifted to the rear exit pupil of the macro objective, so that the object region is optimally and telecentrically illuminated.

The incident illumination device produces an illumination beam having the illumination pupil on the objective side, independently of the objective used.

The microscope configuration of the present invention is, in particular, suited to also implement reflection suppression.

In the case of incident illumination, the illumination beam happens to be reflected at optical interfaces, resulting in disturbing first-order reflections. This problem basically occurs in all objectives; i.e., also in microscope objectives of usual magnification. However, since the numerical aperture of such microscope objectives is significantly larger than that of macro objectives, the reflections therein can be suppressed more efficiently by a suitable objective design. In a microscope according to the present invention, when switching from microscopic observation to survey observation through a macro objective, it is also easily possible to implement reflection suppressing when the macro objective is in place.

In a microscope according to the present invention, it is particularly advantageous if, in order to suppress reflections, a polarizer is insertable into the illumination beam path and an analyzer is insertable into the imaging beam path of the macro objective when the macro objective is in its operating position.

These measures allow significant suppression of the disturbing reflections mentioned above. In particular, the so-called "first-order reflections", which are caused by reflection of the illumination light rays at the first optical subsystem of the macro objective, are (almost) completely eliminated. Once passed through the polarizer, which for this purpose is positionable upstream of at least the first optical subsystem of the macro objective as viewed in the propagation direction of the illumination beam, polarized illuminating light is incident on the first optical subsystem of the macro objective and passes therethrough. Light which is reflected at interfaces of this optical subsystem of the macro objective retains its polarization direction, and at least a portion thereof enters the imaging beam path of the macro objective, respectively of the microscope. An analyzer disposed downstream of the first optical subsystem, as viewed in the propagation direction of the imaging beam, allows the correspondingly polarized light to be filtered out, so that first-order reflections can be completely eliminated. It has been found that the elimination of the disturbing reflections outweighs the disadvantage of reduced light intensity.

The multi-part design of the macro objective allows it to be integrated into an objective turret for holding micro objectives of usual magnification. To this end, the parfocal length of the optical subsystem of the macro objective that is adaptable into the objective turret is selected to be equal to the parfocal length of the other switchable micro objectives. In particular, it is advantageous if the macro objective is composed of two optical subsystems. The first optical subsystem, which is adaptable on the objective turret and also referred to as "field lens portion of the macro objective", may in particular be designed to provide telecentric illumination in the object space. The second optical system of the macro objective is then advantageously disposed between the objective turret and the tube of the microscope.

The term "micro objective" as used in this application is understood to mean a microscope objective for microscopic examination of objects at typical magnifications from above 1× to about 100×, particularly from 1.6× or 5× to 100×, and further particularly from 50× to 100× and higher, while the term "macro objective" should be understood to mean objectives whose magnification ranges from 0.5× to 2×, particularly from 0.5× to 1×, and further particularly is about 0.7×.

In order to direct the illumination beam through the respective objective, the incident illumination device has a beam splitter for coupling the illumination beam path into the imaging beam path of the microscope. The beam splitter is advantageously disposed in the imaging beam path of the microscope. It is advantageous if the above-mentioned polarizer is disposed upstream of the beam splitter as viewed in the propagation direction of the illumination beam, while the analyzer is positioned downstream of the beam splitter as viewed in the propagation direction of the imaging beam.

Furthermore, it is advantageous if the polarizer, the analyzer and the above-mentioned beam splitter are implemented in combination as a prism polarizer (also referred to as "polarizing beam splitter"). The prism polarizer directs the illumination beam toward the first subsystem (field lens potion) of the macro objective, polarizing it in the process, and also filters polarized light out of the imaging beam path of the microscope.

Since in the microscope of the present invention, the illumination pupil is shifted to the rear exit pupil of the macro objective which, in turn, is located between the first optical subsystem of the macro objective and the beam splitter, the reflection suppression measures can be easily implemented without colliding with other optical components. For example, it is possible to place the above-mentioned prism polarizer upstream of the second optical subsystem of the macro objective as viewed in the propagation direction of the imaging beam. It is particularly advantageous if the prism polarizer and the adjustment optics are arranged in a common module which is insertable into the optical path.

Depending on the object to be examined, it may be advantageous to arrange a depolarizer in the first optical subsystem of the macro objective or between the first optical subsystem of the macro objective and the object. Light passing through the first optical subsystem of the macro objective is then depolarized by the depolarizer before it strikes the object. Light which is reflected, scattered and diffracted by the physical features of the object then enters the imaging beam path and can subsequently pass through the analyzer, respectively the prism polarizer. However, if the object to be examined or imaged is itself capable of depolarizing the illuminating light to a sufficient extent, there is no need for such a depolarizer.

The aforementioned depolarizer is advantageously in the form of a $\lambda/4$ plate and/or a quartz plate, and is preferably positioned at an angle with respect to the optical axis.

In a particularly advantageous embodiment, the depolarizer is integrated into the first optical subsystem of the macro objective by incorporating it within the first optical subsystem of the macro objective. Alternatively, integration can be accomplished by cementing the depolarizer to the object-side front lens of the macro objective. For example, if the depolarizer is cemented to the plane surface of a typically shaped front lens, which plane surface is located within the objective, the only remaining surface that may cause reflection is the external surface of the front lens. Since in the case of macro objectives, the aforementioned external surface is generally strongly curved, its contribution to the reflection is very small. Overall, therefore, this objective portion is very compact, and there is no need for the depolarizer to be positioned before the objective portion in a tilted relationship relative thereto.

It is advantageous if the above-mentioned prism polarizer (for reflection prevention) and the pupil adjustment optics (for illumination optimization) are integrated into a macro module. This ensures that both aspects of the present invention are achieved when using the macro module. Furthermore, it is advantages if at least the second optical subsystem of the macro objective is also integrated into the macro module, so that the components needed for macro observation are available simultaneously. Moreover, to ensure simultaneous availability of all components needed for macro observation, it is convenient to provide for positive coupling between the macro module and the turret-mounted first optical subsystem of the macro objective.

It is also useful, in particular, if the incident illumination device of the microscope includes an incident light turret having the macro module disposed therein. For micro objectives, the incident light turret may include other modules, such as a reflector cube comprising a beam splitter or a beam deflector for the desired incident illumination. The above-mentioned positive coupling may be achieved purely mechanically or electromechanically. When survey observation through the macro objective is selected (manually or by automatic control), the first optical subsystem of the macro objective on the objective turret is rotated into the imaging beam path (optical axis) of the microscope, and the above-mentioned macro module is simultaneously inserted into the imaging beam path. If the macro module is disposed in an incident light turret, insertion thereof into the imaging beam path is accomplished by turning the turret. When switching to microscopic observation, a respective micro objective is inserted into the imaging beam path and, as a result of positive coupling, the macro module is removed from the observation beam path and, possibly, another suitable module (reflector cube) is inserted into the beam path. In the case of an automatic microscope, this process may be carried out in a motorized, computer-assisted manner.

FIG. 1a shows, in a very schematic way, the components of a microscope that are relevant for understanding the present invention. Since the basic design of a microscope is known to those skilled in the art, the following description will be limited to the features that are essential to the invention. The known components of a microscope, such as tube, eyepiece, magnification changer, zoom system, attached camera, etc., are not specifically shown in FIG. 1a and the following figures, but referred to as observation optics 9. The microscope 18 shown is, in particular, one used for wafer inspection. Usually, such microscopes are equipped with conventional micro objectives. Particular advantages are provided by the telecentric illumination, where all object points are illuminated with the same aperture and illumination intensity. Telecentric micro objectives known heretofore range up to only 1.6× with a field of view (FOV) of 16 mm. However, it is desirable to obtain a lower-magnification or even reduced overview image of the object field to provide an overview of a larger field of view.

To this end, the embodiment shown in FIG. 1a integrates a macro objective 5 into an objective turret 14 which, apart from that, is equipped with micro objectives 15 in a usual manner. In this embodiment, macro objective 5 has a two-part design including a first optical subsystem 5a (field lens portion) and a second optical subsystem 5b (objective portion). This two-part design allows easy implementation of the telecentric illumination on the one hand, and provides compliance with the typical parfocal length (e.g. 45 mm) on the other. Different macro and micro objectives can be rotated into the imaging beam path by turning objective turret 14 about its axis of rotation 19. Due to the equality in parfocal length, there is no need to refocus when inserting macro objective 5. Moreover, it is possible to stay within the space limitations.

The object to be imaged or microscopically examined is denoted by 6. It is located on a microscope stage 17.

Microscope 18 has an incident illumination device 20, which will be discussed in detail later herein. For the sake of clarity, FIG. 1a shows only light source 8 and incident illumination axis 7, along which extends illumination beam path 28. In order to optimize illumination, incident illumination device 20 includes pupil adjustment optics 2, which cause the illumination pupil to be located in the rear exit pupil of macro objective 5. This will be explained in detail later herein.

Incident illumination device 20 further includes a polarizing beam splitter or beam-splitting prism polarizer, in short prism polarizer 1, which combines the following functions: On the one hand, illumination beam path 28 is coupled into imaging beam path 29 of microscope 18 by deflecting incident light illumination axis 7 onto optical axis 3 of the microscope. In the process, the illuminating light is polarized. Illuminating light passing through prism polarizer 1 may be absorbed by a light trap (not shown) located on an imaginary extension of incident light illumination axis 7. Considering now imaging beam path 29, prism polarizer 1 causes the above-mentioned polarized light to be reflected back along incident light illumination axis 7, while differently polarized light (light having a different polarization component) is able to pass through prism polarizer 1 and may enter observation optics 9 after passing through second optical subsystem 5b of the macro objective. Thus, prism polarizer 1 combines the described components polarizer, beam splitter and analyzer into one unit. This arrangement ensures that reflected light retaining its original polarization direction may not enter observation optics 9. Such light is mainly constituted by first-order reflections caused by reflection at interfaces of first optical subsystem 5a of macro objective 5. Thus, the illustrated configuration makes it possible to eliminate these disturbing first-order reflections.

In order to ensure that light which is reflected at object 6 retaining its original polarization is also prevented from entering observation optics 9, a depolarizer 16 may advantageously be placed between first optical subsystem 5a and object 6. It is possible to use a λ/4 plate as the depolarizer 16, said λ/4 plate advantageously being cemented to the front lens of first optical subsystem 5a of macro objective 5 (see FIG. 1c). Depolarizer 16 ensures that object 6 is not illuminated with polarized illuminating light. Light which is reflected, diffracted and scattered by the physical features of object 6 then passes through field lens portion 5a and into prism polarizer 1 from where, after the aforesaid polarization component is filtered out, it passes into second optical subsystem 5b of macro objective 5 and enters observation optics 9. The light loss involved in this process can be easily accepted because it is greatly outweighed by the advantage of reduced reflection.

As further shown in FIG. 1a, in this exemplary embodiment, incident illumination device 20 has an incident light turret 4 carrying two or more individual modules 10, 11, which can each be inserted into the imaging beam path by turning incident light turret 4 about axis of rotation 13. The module for macro objective 5 is referred to here as macro module 10. In this exemplary embodiment, the aforesaid macro module comprises prism polarizer 1, pupil adjustment optics 2 and second optical subsystem 5b of macro objective 5 as one unit. Suitable coupling between the first optical subsystem 5a of the macro objective and the aforesaid macro module 10 makes it possible to ensure that all components needed for macro observation are always simultaneously in the operating position. At least one further reflector cube 11 comprising a beam splitter 12 is provided here for the remaining micro objectives 15 of microscope 18 (or one such reflector cube 11 is provided for each of said micro objectives).

Figure 1B:
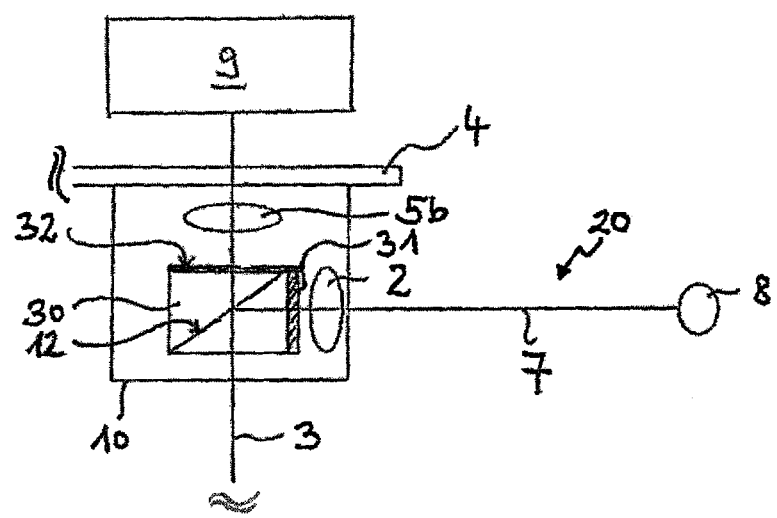
FIG. 1b is a detail view of FIG. 1a, focusing on prism polarizer 1, here in a different embodiment.

FIG. 1b shows a detail of FIG. 1a, focusing on the macro module 10 shown therein. Like components are denoted by like numerals, and will not be described in greater detail again. In FIG. 1b, a splitter module 30 is shown in place of a prism polarizer 1. Beam-splitting prism polarizers or polarizing beam splitters are available in different designs. Alternatively, it is possible to use the classical design shown in FIG. 1b, where splitter module 30 has a polarizer 31 on the illumination side and an analyzer 32 on the imaging side. A beam splitter 12 divides splitter module 30 diagonally to deflect incident light illumination axis 7 in the direction of optical axis 3. Polarizer 31, analyzer 32 and beam splitter 12 are generally known to those skilled in the art and, therefore, will not be further described herein. It should also be noted that the term "prism polarizer" as used herein may include the splitter module 30 shown in FIG. 1b.

Figure 1C:
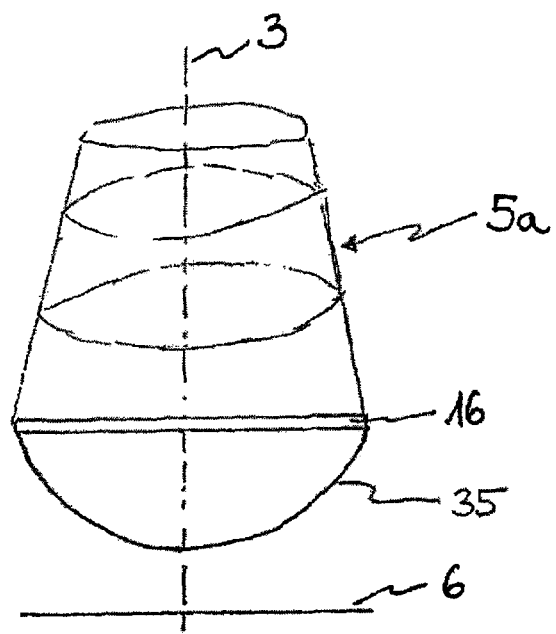
FIG. 1c is a detail view of FIG. 1a, focusing on subsystem 5a of the macro objective and the depolarizer, here in a different embodiment.

FIG. 1c shows another detail of FIG. 1a, focusing on the object-side optical subsystem 5a of macro objective 5. FIG. 1c shows a variant where, in contrast to FIG. 1a, depolarizer 16 is cemented to the plane surface of front lens 35, which plane surface is located within subsystem 5a. Front lens 35 is the lens of object-side optical subsystem 5a of macro objective 5 that faces object 6. FIG. 1c illustrates the compact design of objective portion 5a. Due to the strong curvature of the external surface of front lens 35 facing object 6, any possible reflections at this surface are very low.

Figure 2:
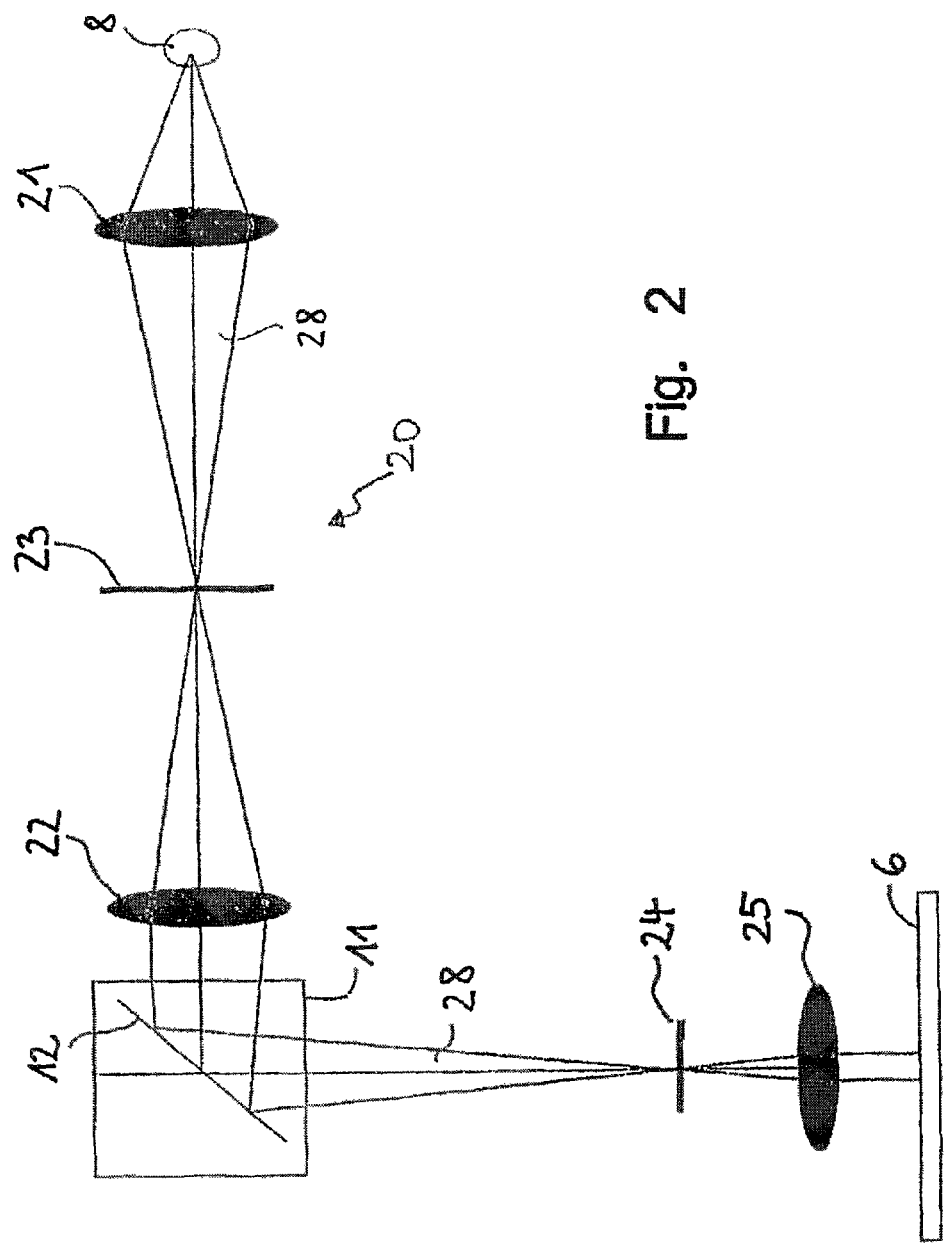
FIG. 2 is a schematic view illustrating the usual illumination beam path when a micro objective of usual magnification is used.

FIG. 2 schematically shows the illumination conditions prevailing during the use of classical micro objectives. The standard micro objective is denoted by 25. Incident illumination device 20 includes illumination optics 21, 22, an aperture stop 23, as well as a deflecting element 12 for illumination beam path 28. The aforementioned deflecting element may be disposed, for example, in the reflector cube 11 described earlier herein. Light source 8 is imaged at the position of aperture stop 23 by illumination optics 21, and is further imaged at the position of objective exit pupil 24 by means of illumination optics 22. Standard objective 25 and illumination optics 21 and 22 are shown in a very schematic form. Typically, these systems include a plurality of lenses and optional components, such as filters, diaphragms, etc. If the illumination pupil is located in objective exit pupil 24, it is possible to illuminate object 6 telecentrically. This type of illumination is here the incident illumination preferably implemented for micro objectives from 5× to 100×.

Figure 3:
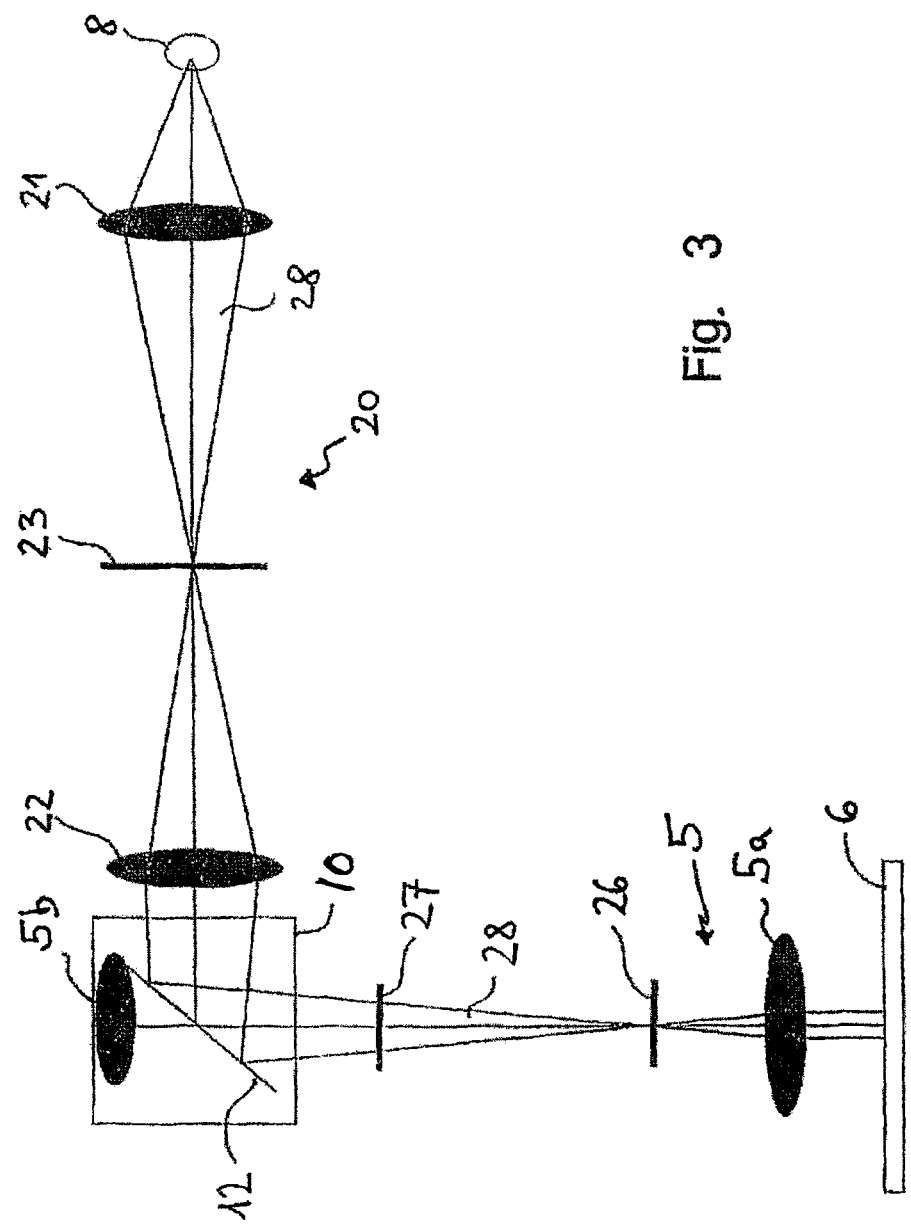
FIG. 3 is a schematic view showing the illumination beam path when a simple macro objective is used.

FIG. 3 illustrates the illumination conditions prevailing when a macro objective 5 is used. For purposes of telecentric illumination, the aforesaid macro objective is selected to be a two-part design and, therefore, can be divided into a field lens portion 5a and an objective portion 5b. The remaining components and elements of FIG. 3 correspond to those of FIG. 2 and, therefore, will not be separately described herein. While illumination pupil 26 is at the same position as in the arrangement shown in FIG. 2, rear exit pupil 27 of macro objective 5 is clearly set apart from illumination pupil 26, namely toward second subsystem 5b of macro objective 5; i.e., exit pupil 27 of macro objective 5 is located between first optical subsystem 5a of the macro objective and beam splitter 12. The significant spatial separation between exit pupil 27 and illumination pupil 26 results in insufficient illumination of rear exit pupil 27 of the macro objective, so that only a small portion of the object field can be illuminated, while the field of view is significantly larger, and, in particular, the object is no longer telecentrically illuminated. (In fact, in FIG. 3, the beam is slightly divergent between first optical subsystem 5a of the macro objective 5 and object 6.)

Figure 4:
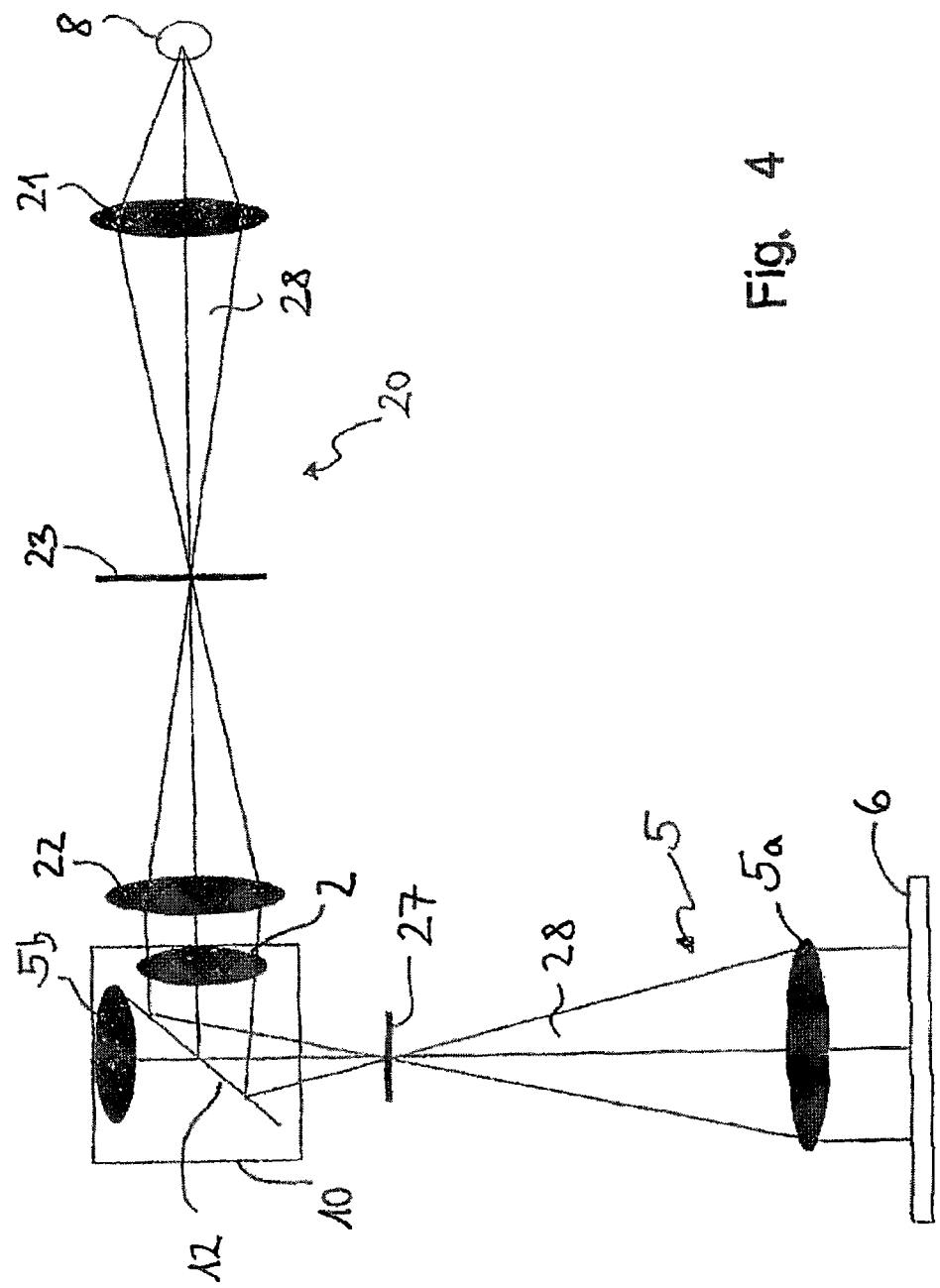
FIG. 4 is a schematic view showing the illumination beam path when using a macro objective having adjustment optics for the illumination pupil.

One way to solve this problem is shown in FIG. 4. By inserting pupil adjustment optics 2 into illumination beam path 28 of incident illumination device 20, it is possible to shift the position of illumination pupil 26 to the position of exit pupil 27 of macro objective 5, and ideally to bring the two positions into coincidence. As a result, the "shifted" illumination pupil 26 is located between first optical subsystem 5a of macro objective 5 and beam splitter 12. Preferably, this position is slightly below macro module 10. A comparison of FIGS. 3 and 4 shows that this shift in the position of illumination pupil 26 results in that a much larger portion of the object field can be illuminated, and that object 6 is now illuminated telecentrically. Since this type of illumination adjustment is only useful for macro objectives, it is advantageous for pupil adjustment optics 2 and second optical subsystem 5b (objective portion) of the macro objective (as well as possible further subsystems) to be combined into a reflector cube 10, which may also be referred to as macro module 10. Macro module 10 can then be inserted into the beam path always together with first optical subsystem 5a (field lens portion) of the macro objective. To this end, the corresponding movements of objective turret 14 (see FIG. 1a) and incident light turret 4 (see FIG. 1a) may be positively coupled in a software-based manner and electromechanically, electronically or purely mechanically. As a result of the illumination adjustment, the available field of view is completely illuminated, the illumination being telecentric in the exemplary embodiment shown.

The configuration described above allows a 0.7× macro objective having a field of view (FOV) of 36 mm to be implemented in a standard objective turret.

List of Reference Numerals
1 prism polarizer
2 (pupil) adjustment optics
3 optical axis
4 incident light turret
5 macro objective
5a, 5b first and second optical subsystem of the macro objective
6 object
7 incident light illumination axis
8 light source
9 observation optics
10 macro module
11 reflector cube
12 beam splitter, beam deflector
13 axis of rotation of the incident light turret
14 objective turret
15 micro objective
16 depolarizer
17 microscope stage
18 microscope
19 axis of rotation of the objective turret
20 incident light illumination device
21, 22 incident light illumination optics
23 aperture stop
24 exit pupil of the micro objective
25 standard micro objective
26 illumination pupil
27 exit pupil of the macro objective
28 illumination beam path
29 imaging beam path
30 splitter module
31 polarizer
32 analyzer
35 front lens

What is claimed is:
1. A microscope (18) comprising:
an objective turret for holding at least one micro objective and at least one macro objective to allow rotation of the at least one micro objective or the at least one macro objective to an operational position on an optical axis;
observation optics in an imaging beam path; and
an incident illumination device generating an illumination beam path, said incident illumination device including a beam splitter for coupling the illumination beam path into the imaging beam path,
wherein said at least one macro objective includes a first optical subsystem being attachable to the objective turret, and a second optical subsystem being insertable into the imaging beam path between the objective turret and the observation optics when the first optical subsystem is rotated to the operational position on the optical axis,
wherein said incident illumination device allows a telecentric illumination beam path with an illumination pupil on an objective side to be produced by the at least one micro objective in the operational position, or to be produced by the at least one macro objective in the operational position; and wherein adjustment optics having positive refractive power, are insertable into the illumination beam path when the at least one macro objective is rotated to the operational position, said adjustment optics causing the illumination pupil to be shifted to a rear exit pupil of the at least one macro objective, said rear exit pupil being located between the first optical subsystem and the beam splitter.

2. The microscope as recited in claim 1, wherein in order to suppress reflections, a polarizer is insertable into the illumination beam path and an analyzer is insertable into the imaging beam path of the at least one macro objective.

3. The microscope as recited in claim 2, wherein the polarizer, the analyzer and the beam splitter are implemented in combination as a prism polarizer.

4. The microscope as recited in claim 3, further comprising a macro module including the prism polarizer and the second optical subsystem.

5. The microscope as recited in claim 4, wherein the incident illumination device includes an incident light turret for carrying the macro module.

6. The microscope as recited in claim 4, wherein the macro module further comprises the adjustment optics.

7. The microscope as recited in claim 3, further comprising a macro module including the prism polarizer and the adjustment optics.

8. The microscope as recited in claim 3, further comprising a macro module including the adjustment optics and the second optical subsystem.

9. The microscope as recited in claim , wherein the macro module is coupled together with the first optical subsystem to the operational position on the optical axis.

10. The microscope as recited in claim 2, wherein a depolarizer is arranged either in (1) the first optical subsystem of the at least one macro objective, or (2) between the first optical subsystem of the at least one macro objective and an object to be imaged by the microscope.

11. The microscope as recited in claim 10, wherein the depolarizer is in the form of either a $\lambda/4$ plate or a quartz plate.

12. The microscope as recited in claim 10, wherein the depolarizer is integrated into the first optical subsystem of the at least one macro objective by cementing the depolarizer to an object-side front lens of the at least one macro objective.

13. The microscope as recited in claim 10, wherein the depolarizer is disposed within the first optical subsystem of the at least one macro objective.

14. The microscope as recited in claim 1, wherein the adjustment optics shift the illumination pupil on the objective side of the illumination beam path to illuminate the rear exit pupil of the at least one macro objective in the operational position.

15. The microscope as recited in claim 1, wherein the second optical subsystem is disposed between the objective turret and a tube of the microscope.

* * * * *